(12) United States Patent
Hsieh

(10) Patent No.: US 6,915,288 B2
(45) Date of Patent: Jul. 5, 2005

(54) METHOD AND SYSTEM FOR DOWNLOADING DATA FROM AUTO-STORAGE DATABASE

(75) Inventor: Ming-Hsiao Hsieh, Taipei (TW)

(73) Assignee: Inventec Corporation, Taiwan (CN)

( * ) Notice: Subject to any disclaimer, the term of this patent is extended or adjusted under 35 U.S.C. 154(b) by 431 days.

(21) Appl. No.: 10/026,600

(22) Filed: Dec. 20, 2001

(65) Prior Publication Data

US 2003/0120629 A1 Jun. 26, 2003

(51) Int. Cl.[7] ............................................. G06F 17/30
(52) U.S. Cl. ................................... 707/1; 707/9; 707/10
(58) Field of Search .................................. 707/1, 9, 10

(56) References Cited

U.S. PATENT DOCUMENTS

| | | | |
|---|---|---|---|
| 6,427,170 B1 * | 7/2002 | Sitaraman et al. | 709/226 |
| 2002/0110123 A1 * | 8/2002 | Shitama | 370/389 |
| 2003/0149601 A1 * | 8/2003 | Cabral | 705/5 |

* cited by examiner

*Primary Examiner*—Safet Metjahic
*Assistant Examiner*—Haythim Alaubaidi
(74) *Attorney, Agent, or Firm*—Peter F. Corless; Steven M. Jensen; Edwards & Angell, LLP

(57) ABSTRACT

A method and a system for downloading data from an auto-storage database are proposed, allowing a server to perform one-time data retrieval for transmitting data to terminal devices that request for data downloading. Upon receiving a connection request from a terminal device, the server stores an IP address of the terminal device into an IP address temporary storage area. Then, the server starts timing, and performs one-time data retrieval for retrieving data from a database if counted time reaches a preset time value pre-stored in the server. The retrieved data is transmitted by the server to the terminal device whose IP address is stored in the IP address temporary storage area, and then the terminal device requests for terminating the connection to the server for stopping data transmission. The foregoing method and system are advantageous of not to occupy too much network bandwidth even in operation of many terminal devices.

11 Claims, 2 Drawing Sheets

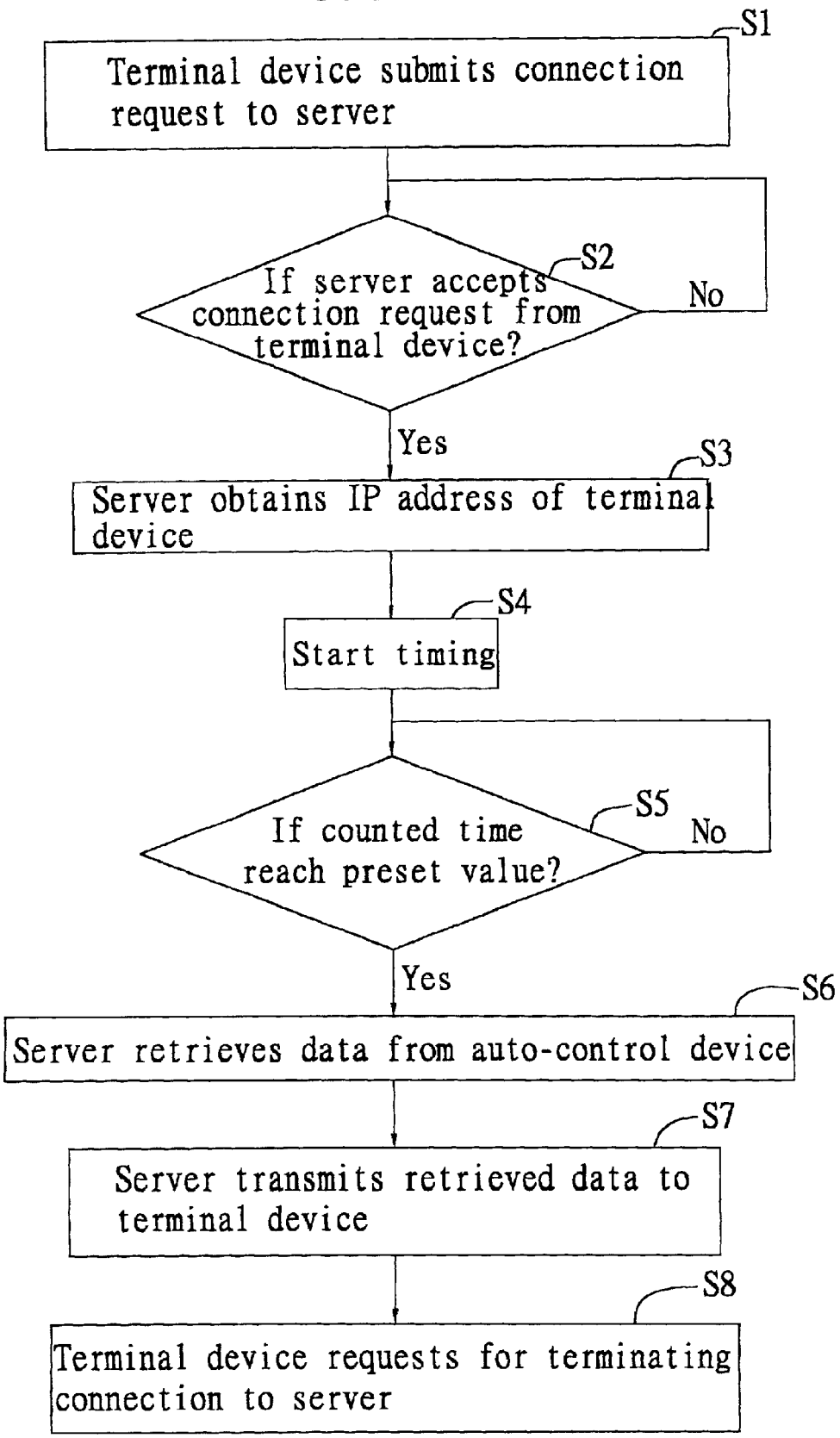

METHOD AND SYSTEM FOR DOWNLOADING DATA FROM AUTO-STORAGE DATABASE

FIELD OF THE INVENTION

The present invention relates to methods and systems for downloading data from auto-storage databases, and more particularly, to a method and a system for downloading data from an auto-storage database, in which a server only needs to process data-retrieval once to provide all terminal devices of clients with requested data.

BACKGROUND OF THE INVENTION

Nowadays, in general, a large amount of data are stored in a server for facilitating a client to download the data to its terminal device, so as to desirably reduce costs of data maintenance, renewal and transmission. Besides, for obtaining the latest information in real time, terminal devices of clients can request for downloading updated data stored in the server.

However, the foregoing client/server system is disadvantageous in that, if too many clients request for data downloading from the server at the same time, overload of the server and reduction in available network bandwidth can easily occur; this in turn impairs the proper operation of network. Moreover, as to prevent the over occupation of network bandwidth for allowing the smooth operation of network, if the frequency of data-retrieval requests from the clients to the server is limited, or time intervals of request submission between the clients are prolonged, then the clients would be unable to obtain data in real time; in the case of more clients in operation, data retrieval efficiency becomes even worse.

Therefore, in accordance with the foregoing drawbacks, how to reduce the server's load and occupation of network bandwidth for providing an efficient real time data transmission, is a critical problem to solve.

SUMMARY OF THE INVENTION

A primary objective of the present invention is to provide a method and a system for downloading data from an auto-storage database, which can be applied to a client/server system, for reducing the load of a server.

Another objective of the invention is to provide a method and a system for downloading data from an auto-storage database, which can be applied to a client/server system, for allowing a terminal device of a client to retrieve updated data from a server in real time, without reducing availability of network bandwidth.

In accordance with the foregoing and other objectives, the present invention proposes a method and a system for downloading data from an auto-storage database. The method of downloading data from an auto-storage database, allowing a server to perform one-time data retrieval for transmitting data to terminal devices that request for data downloading; the method comprising the steps of: (1) submitting a connection request via a terminal device to the server; (2) determining via the server if to accept the connection request from the terminal device; wherein if the request is accepted, step (3) is proceeded; or else, the step (2) is returned; (3) storing an IP (Internet protocol) address of the terminal device that submits the connection request via the server into an IP address temporary storage area; (4) starting timing via the server and determining if counted time reaches a preset time value of data retrieval that is pre-stored in the server; wherein if the preset time value is reached, step (5) is proceeded; or else, the step (4) is returned; (5) executing one-time data retrieval via the server for retrieving data from a database, and transmitting the retrieved data to the terminal device whose IP address is stored in the IP address temporary storage area; and (6) requesting via the terminal device for terminating the connection to the server upon receiving the retrieved data, allowing the server to stop transmitting data to the terminal device.

The system for downloading data from an auto-storage database of the invention is applicable to a data display system, and comprises: at least a terminal device for allowing a client to input a connection request and outputting data to the client, the terminal device being provided with a unique IP (Internet protocol) address; an auto-control device having a database for storing data generated during operation of the auto-control device; and a server including an IP address temporary storage area, a timing module, a retrieving module and a downloading module, wherein, when the server receives the connection request from the terminal device, it stores the IP address of the terminal device into the IP address temporary storage area, and prompts the timing module to start timing, so as to determine if counted time reaches a preset time value of data retrieval that is pre-stored in the server; if the preset time value is reached, the retrieving module retrieves data from the database of the auto-control device; then, the downloading module transmits the retrieved data to the terminal device whose IP address is stored in the IP address temporary storage area; and the terminal device displays the retrieved data and requests for terminating the connection to the server.

The terminal device submits the connection request to the server through the use of transmission control protocol (TCP). The server stores the IP address of the terminal device, and then performs one-time data retrieval for retrieving data from the database, so as to transmit the retrieved data to the terminal device through the use of user datagram protocol (UDP). Thus, processes of data transmission between the server and the client are significantly simplified, and over occupation of network bandwidth or overload of the server can be effectively reduced even in operation of many terminal devices.

The method and system for data downloading of the invention are advantageous in that, the frequency of the server responding to the client corresponds to that of the server retrieving data from the database. In other words, it is different from the prior art having the frequency of data retrieval via a server from a database corresponding to the sum of frequency of all terminal devices requesting for data retrieval. Therefore, in the use of the method and system of the invention, even if many terminal devices request the server for multiple data retrieval at the same time, the server would not be over loaded.

BRIEF DESCRIPTION OF THE DRAWINGS

For more complete understanding of the present invention, reference will be made to the following detailed description of preferred embodiments taken in conjunction with the accompanying drawings, in which:

FIG. 2 is a schematic diagram showing the steps involved in a method for downloading data from an auto-storage database of the invention.

DETAILED DESCRIPTION OF THE PREFERRED EMBODIMENTS

Figure 1:
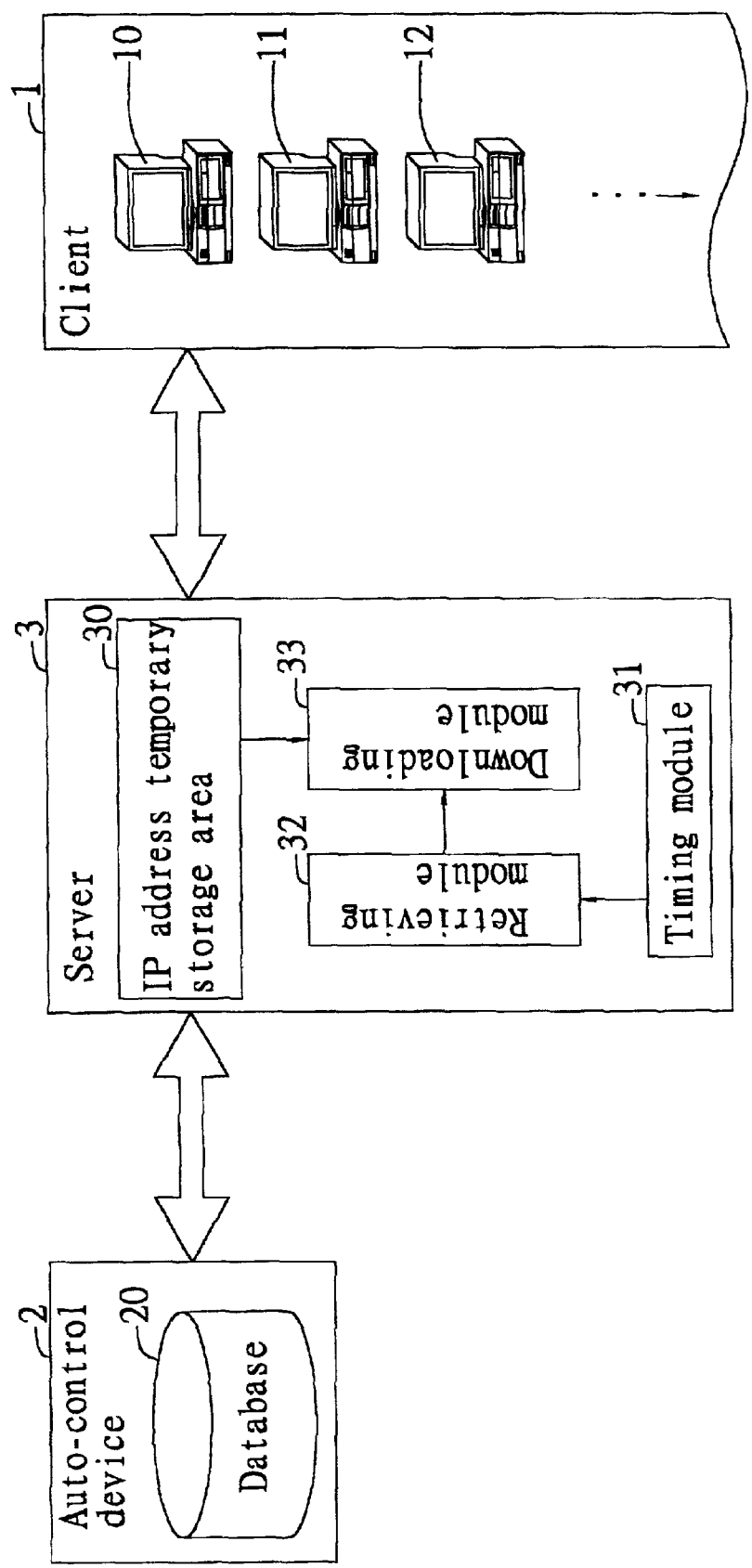
FIG. 1 is a schematic block diagram showing the architecture of a system for downloading data from an auto-storage database of the invention.

Referring to FIG. 1, it illustrates a preferred embodiment of the architecture of a system for downloading data from an auto-storage database of the present invention. The system for downloading data from the auto-storage database of the invention, for example, is structured in a data display system with an auto-control device, allowing a client to retrieve data generated during the operation of the auto-control device. As shown in the drawing, the system for downloading data from the auto-storage database comprises: a client 1, an auto-control device 2 and a server 3.

The client 1 includes a plurality of terminal devices 10, 11, 12, wherein each of the terminal devices is provided with a unique Internet protocol (IP) address for identification and data transmission. The auto-control device 2 has a database 20 for storing data generated during the operation of the auto-control device 2, allowing the client 1 to retrieve data from the database 20. The server 3 is a workstation constructed based on the transmission control protocol/internet protocol (TCP/IP), and externally connected to a network communication system (not shown) e.g. Internet or intranet. The server 3 can be connected with the client 1 via the network communication system, and receive data-retrieval requests from the terminal devices 10, 11, 12 of the client 1, so as to transmit the requested data from the database 20 through the server 3 to the client 1. Since TCP/IP are well known protocols in the network industry, they are not further detailed hereinafter. The server 3 of the invention comprises an IP address temporary storage area 30, a timing module 31, a retrieving module 32 and a downloading module 33.

The IP address temporary storage area 30 is used for storing IP addresses of terminal devices 10, 11, 12 that submit connection requests to the server 3. After the server 3 temporarily stores the IP addresses into the IP address temporary storage area 30, the terminating devices 10, 11, 12 are in a standby status.

The timing module 31 is preset with a time value of data retrieval. When any terminal device 10, 11, 12 of a client 1 submits a connection request, the timing module 31 starts timing and determines if the counted time reaches the preset time value.

The retrieving module 32 is prompted to retrieve data from the database 20 of the auto-control device 2 when time counted by the timing module 31 reaches the preset time value of data retrieval.

The downloading module 33 is constructed based on the user datagram protocol (UDP). After the retrieving module 32 retrieves data from the database 20, the downloading module 33 transmits the retrieved data through UDP to terminal devices 10, 11, 12 whose IP addresses are currently stored in the IP address temporary storage area 30.

When standby terminal devices 10, 11, 12 receive data transmitted from the downloading module 33, they can request through TCP for terminating the connection to the server 3. After the terminal devices are disconnected from the server 3, data retrieval from the auto-control device 2 is also ended.

Referring to FIG. 2, it illustrates a method for downloading data from an auto-storage database of the invention. The following description is made with reference to FIGS. 1 and 2. When any terminal device of a client 1 desires to retrieve data from a database 20 of an auto-control device 2, first in step S1, the terminal device submits a connection request to a server 3 through TCP. Then, step S2 is proceeded.

In step S2, the server 3 determines if to accept the connection request from the terminal device of the client 1. If the request is accepted, then step S3 is proceeded; or else, the step S2 is returned.

In step S3, the server 3 stores an IP address of the terminal device that submits the connection request into an IP address temporary storage area 30. Then, step S4 is proceeded.

In step S4, upon receives the connection request from the terminal device of the client 1, the server 3 prompts a timing module 31 to start timing. Then, step S5 is proceeded.

In step S5, the timing module 31 compares the currently counted time with a preset time value of data retrieval that is pre-stored in the server, so as to determine if the counted time reaches the preset time value. If the preset time value is reached, then step S6 is proceeded; or else, the step S5 is returned.

In step S6, a retrieving module 32 of the server 3 retrieves data from the database 20 of the auto-control device 2. Then, step S7 is proceeded.

In step S7, a downloading module 33 of the server 3 transmits the retrieved data through UDP to the requesting terminal device whose IP address is stored in the IP address temporary storage area 30. Then, step S8 is proceeded.

In step S8, after the terminal device receives the retrieved data from the server 3, it requests for terminating the connection to the server 3 through TCP, and then the server 3 stops transmitting data to the terminal device.

In conclusion, the method and system for downloading data from an auto-storage database of the invention establish network communication between a client 1 and a server 3 through the use of TCP and UDP. In other words, terminating devices 10, 11, 12 of the client 1 upload their unique IP addresses to the server 3 through TCP, and then the server 3 is in charge of retrieving data from an auto-control device 2 at certain time intervals, for transmitting the retrieved data through UDP to the terminal devices 10, 11, 12 whose IP addresses are uploaded. Therefore, compared to the prior art, the method and system for downloading data of the invention are advantageous of reducing the frequency of data retrieval from a database 20 of the auto-control device 20. Further due to the use of UDP for one-way communication only, processes of data transmission between the client 1 and the server 3 are significantly simplified, allowing network bandwidth to be much less occupied. Moreover, since only the server 3 is in charge of data retrieval from the auto-control device 20, it is easy to modify the data retrieving frequency of the server 3 if necessary. In addition, since the terminal devices 10, 11 and 12 of the client 1 only need to submit their IP addresses and receive the retrieved data, it effectively simplifies the program design and installation, allowing the client 1 to readily implement and practice the method and system for data downloading of the invention.

While the present invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A method for downloading data from an auto-storage database, allowing a server to perform one-time data retrieval for transmitting data to terminal devices that request for data downloading; the method comprising the steps of:

(1) submitting a connection request via a terminal device to the server;

(2) determining via the server if to accept the connection request from the terminal device; wherein if the request is accepted, step (3) is proceeded; or else, the step (2) is repeated;

(3) storing an IP (Internet protocol) address of the terminal device that submits the connection request via the server into an IP address temporary storage area;

(4) starting timing via the server and determining if counted time reaches a preset time value of data retrieval that is pre-stored in the server; wherein if the preset time value is reached, step (5) is proceeded; or else, the step (4) is repeated;

(5) executing one-time data retrieval via the server for retrieving data from a database, and transmitting the retrieved data to the terminal device whose IP address is stored in the IP address temporary storage area; and (6) requesting via the terminal device for terminating connection to the server upon receiving the retrieved data, allowing the server to stop transmitting data to the terminal device.

2. The method of claim 1, wherein in the step (1), the terminal device submits the connection request to the server through the use of transmission control protocol (TCP).

3. The method of claim 1, wherein in the step (5), the server transmits the retrieved data to the terminal device through the use of user datagram protocol (UDP).

4. The method of claim 1, wherein in the step (6), the terminal device requests for terminating the connection to the server through the use of TCP.

5. The method of claim 1, wherein the database is established in an auto-controls device, for storing data generated during operation of the auto-control device.

6. The method of claim 1, wherein the method for downloading data from an auto-storage database is applicable to a data display system.

7. A system for downloading data from an auto-storage database, comprising:

at least a terminal device for allowing a client to input a connection request and outputting data to the client, the terminal device being provided with a unique IP (Internet protocol) address;

an auto-control device having a database for storing data generated during operation of the auto-control device; and a server including an IP address temporary storage area, a timing module, a retrieving module and a downloading module, wherein, when the server receives the connection request from the terminal device, it stores the IP address of the terminal device into the IP address temporary storage area, and prompts the timing module to start timing, so as to determine if counted time reaches a preset time value of data retrieval that is pre-stored in the server; if the preset time value is reached, the retrieving module retrieves data from the database of the auto-control device; then, the downloading module transmits the retrieved data to the terminal device whose IP address is stored in the IP address temporary storage area; and the terminal device displays the retrieved data and requests for terminating connection to the server.

8. The system of claim 7, wherein the terminal device submits the connection request to the server through the use of transmission control protocol (TCP).

9. The system of claim 7, wherein upon retrieving data from the database, the server transmits the retrieved data to the terminal device through the use of user datagram protocol (UDP).

10. The system of claim 7, wherein upon receiving the retrieved data from the server, the terminal device requests for terminating the connection to the server through the use of TCP.

11. The system of claim 7, wherein the system for downloading data from an auto-storage database is applicable to a data display system.

* * * * *